(12) United States Patent
Schmidt (10) Patent No.: US 11,655,173 B2
(45) Date of Patent: May 23, 2023

(54) METHODS OF SEPARATING AND ISOLATING WATER AND OTHER DESIRED CONSTITUENTS FROM OILFIELD PRODUCED BRINES

(71) Applicant: NLB Water, LLC, Denver, CO (US)

(72) Inventor: Ernst Schmidt, Knoxville, TN (US)

(73) Assignee: NLB Water, LLC, Denver, CO (US)

( * ) Notice: Subject to any disclaimer, the term of this patent is extended or adjusted under 35 U.S.C. 154(b) by 201 days.

(21) Appl. No.: 17/115,061

(22) Filed: Dec. 8, 2020

(65) Prior Publication Data

US 2021/0094855 A1 Apr. 1, 2021

Related U.S. Application Data

(63) Continuation of application No. 16/285,317, filed on Feb. 26, 2019, now Pat. No. 10,899,646.

(Continued)

(51) Int. Cl.
*C02F 9/00* (2023.01)
*B01D 61/04* (2006.01)
*B01D 61/58* (2006.01)
*C02F 1/40* (2023.01)
*C02F 1/44* (2023.01)

(Continued)

(52) U.S. Cl.
CPC ............. *C02F 9/00* (2013.01); *B01D 61/04* (2013.01); *B01D 61/58* (2013.01); *B01D 61/025* (2013.01); *B01D 61/026* (2022.08); *B01D 61/147* (2013.01); *B01D 61/422* (2013.01); *B01D 61/445* (2013.01); *B01D 2311/04* (2013.01); *B01D 2311/06* (2013.01); *B01D 2311/08* (2013.01); *B01D 2311/18* (2013.01); *B01D 2311/25* (2013.01); *B01D 2311/268* (2013.01); *B01D 2311/2626* (2013.01); *B01D 2311/2634* (2013.01); *B01D 2311/2642* (2013.01); *B01D 2311/2669* (2013.01);

(Continued)

(58) Field of Classification Search
None
See application file for complete search history.

(56) References Cited

U.S. PATENT DOCUMENTS 10,899,646 B2 * 1/2021 Schmidt .................. C02F 9/00
2013/0020259 A1 1/2013 Wallace (Continued)

FOREIGN PATENT DOCUMENTS

WO 2006116533 A2 11/2006

OTHER PUBLICATIONS

"International Search Report and Written Opinion received for PCT Patent Application No. PCT/US2019/019478, dated Jul. 26, 2019", 18 Pages.

(Continued)

*Primary Examiner* — Chester T Barry
(74) *Attorney, Agent, or Firm* — Blanchard Horton PLLC (57) ABSTRACT

An integrated, membrane-based process to produce purified water and conversion of salt to high value chemicals from oil and gas well produced water is described. A liquid stream including water and dissolved salt is flowed through pre-treatment units and one or more desalination and concentration units which remove at least a portion of the water to form a brine enriched in dissolved salt. The purified high-density brine may be subjected to electrically-enforced salt dissociation techniques to produce chemicals from oil and gas produced water.

38 Claims, 8 Drawing Sheets

Related U.S. Application Data (60) Provisional application No. 62/636,962, filed on Mar. 1, 2018.

(51) Int. Cl.
| | |
|---|---|
| C02F 1/66 | (2023.01) |
| C02F 1/52 | (2023.01) |
| C02F 1/76 | (2023.01) |
| C02F 101/32 | (2006.01) |
| C02F 103/36 | (2006.01) |
| C02F 1/469 | (2023.01) |
| B01D 61/42 | (2006.01) |
| B01D 61/44 | (2006.01) |
| B01D 61/14 | (2006.01) |
| B01D 61/02 | (2006.01) |
| C02F 1/467 | (2023.01) |

(52) U.S. Cl.
CPC ........ *B01D 2311/2673* (2013.01); *C02F 1/40* (2013.01); *C02F 1/441* (2013.01); *C02F 1/442* (2013.01); *C02F 1/444* (2013.01); *C02F 1/4672* (2013.01); *C02F 1/4693* (2013.01); *C02F 1/5245* (2013.01); *C02F 1/66* (2013.01); *C02F 1/76* (2013.01); *C02F 2101/32* (2013.01); *C02F 2101/322* (2013.01); *C02F 2103/365* (2013.01); *C02F 2303/16* (2013.01)

(56) References Cited

U.S. PATENT DOCUMENTS

| | | |
|---|---|---|
| 2018/0028978 A1 | 2/2018 | Chen |
| 2019/0270660 A1 | 9/2019 | Schmidt |
| 2019/0352202 A1 | 11/2019 | Smith et al. |
| 2020/0299805 A1* | 9/2020 | McEachern ............. B01J 20/18 |

OTHER PUBLICATIONS

Jimenez, et al., "State of the Art of Produced Water Treatment", Chemosphere, 192, 2018, 186-208.

\* cited by examiner

Niobrara/DJ Basin Coil Water Test Result Summary

| Parameter (ppm unless noted) | As Received | Pretreated | Desalted | % Removed |
|---|---|---|---|---|
| pH | 7.69 | 8.6 | 9.6 | ---- |
| Conductivity (µS/cm) | 31600 | 26211 | 223 | 99.29 |
| TDS | 16600 | 14001 | 115 | 99.30 |
| Total Hardness (CaCO3) | 200 | 14 | ND | >99.99 |
| Aluminum | 4.78 | ND | NA | >99.99 |
| Calcium | 53.9 | 3.25 | NA | 93.97 |
| Iron | 22.7 | ND | NA | >99.99 |
| Magnesium | 11.4 | 2.93 | NA | 74.29 |
| Boron | 9.33 | NA | 6.0 | 35.69 |
| Barium | 1.69 | 0.0602 | NA | 96.43 |
| Manganese | ND | ND | NA | ----- |
| Strontium | 6.47 | 0.598 | NA | 90.75 |
| Sulfate | 189 | ND | NA | >99.99 |
| Silicon | 19.0 | NA | 0.0698 | 99.63 |
| Silica (SiO2) | 40.7 | NA | 0.149 | 99.63 |
| TSS | 264 | ND | NA | >99.99 |
| TOC | 2860 | 493 | 3.46 | 99.87 |
| Oil & Grease | 180 | ND | NA | >99.99 |

ND – Not Detected at or above the reporting limit
NA – Not Analyzed

Fig.3

Niobrara/DJ Basin Flowback Test Result Summary

| Parameter (ppm unless noted) | As Received | Pretreated | Desalted | % Removed |
|---|---|---|---|---|
| pH | 6.97 | 8.56 | 9.98 | ----- |
| Conductivity (µS/cm) | 22800 | 18130 | 223 | 99.02 |
| TDS | 17300 | 10200 | 52 | 99.69 |
| Total Hardness (as CaCO3) | 600 | 25 | ND | >99.99 |
| Aluminum | 11.6 | ND | NA | >99.99 |
| Calcium | 205 | 7.22 | NA | 96.47 |
| Iron | 34.1 | ND | NA | >99.99 |
| Magnesium | 2620 | 1.44 | NA | 99.94 |
| Boron | 17.6 | NA | 1.44 | 91.81 |
| Barium | 4.56 | 0.0688 | NA | 98.49 |
| Manganese | ND | ND | NA | ----- |
| Strontium | 19.9 | 1.23 | NA | 93.81 |
| Sulfate | 243 | ND | NA | >99.99 |
| Silicon | 48.5 | NA | 0.0439 | 99.90 |
| Silica (SiO2) | 104 | NA | 0.0939 | 99.90 |
| TSS | ND | ND | NA | ----- |
| TOC | 4440 | NA | 159 | 96.41 |

ND – Not Detected at or above the reporting limit
NA – Not Analyzed

Fig.4

Niobrara/DJ Basin Produced Water Test Result Summary

| Parameter (ppm unless noted) | As Received | Pretreated | Desalted | % Removed |
|---|---|---|---|---|
| pH | 6.095 | 7.55 | 6.67 | ------ |
| Conductivity (µS/cm) | 35500 | 28250 | 306 | 99.14 |
| TDS | 23900 | 16700 | 200 | 99.16 |
| Total Hardness (CaCO3) | 1010 | <1 | ND | >99.99 |
| Aluminum | 0.0596 | ND | ND | >99.99 |
| Calcium | 316 | 1.12 | ND | >99.99 |
| Iron | 203 | ND | ND | >99.99 |
| Magnesium | 45.7 | 0.491 | NA | 98.92 |
| Boron | 21.1 | NA | 1.53 | 92.75 |
| Barium | 16.3 | 0.0717 | NA | 99.56 |
| Manganese | 2.16 | ND | ND | >99.99 |
| Strontium | 51.7 | 0.375 | NA | 99.27 |
| Silicon | 41.9 | NA | 0.0289 | 99.93 |
| Silica (SiO2) | 89.6 | NA | 0.0618 | 99.93 |
| TSS | 540 | ND | ND | >99.99 |
| TOC | 1130 | 7.91 | 2.43 | 99.78 |
| Sulfate | ND | ND | NA | ----- |

ND – Not Detected at or above the reporting limit
NA – Not Analyzed

Fig.5

Permian Basin Produced Water Test Result Summary

| Parameter (ppm) | Influent | Pretreated | Concentrate |
|---|---|---|---|
| TDS | 51,900 | 44,279 | 200,000 |
| Total Hardness (as CaCO3) | 2,300 | ND | ND |
| Aluminum | ND | ND | ND |
| Barium | 1.39 | 0.0385 | ND |
| Beryllium | ND | ND | ND |
| Calcium | 754 | 0.870 | ND |
| Copper | ND | ND | ND |
| Iron | ND | ND | ND |
| Magnesium | 175 | 0.870 | ND |
| Manganese | ND | ND | ND |
| Strontium | 265 | 1.11 | 1.38 |
| Sulfate | NA | ND | NA |

ND – Not Detected at or above the reporting limit
NA – Not Analyzed

Fig.6

Ardmore Basin Produced Water Test Result Summary

| Parameter (ppm unless noted) | Influent | Pretreated | Desalted | Removal (%) |
|---|---|---|---|---|
| pH | 6.2 | 11.5 | 7.22 | ----- |
| Conductivity (µS/cm) | 121000 | 100000 | <1 | >99.99 |
| TDS | 89000 | 73200 | ND | >99.99 |
| Total Hardness (CaCO3) | 19,223 | ND | NA | >99.99 |
| Aluminum | 10.5 | ND | NA | >99.99 |
| Calcium | 5230 | 3.01 | NA | 99.94 |
| Iron | 5.81 | ND | NA | >99.99 |
| Magnesium | 1,560 | 0.776 | NA | 99.95 |
| Barium | 120 | 0.09 | NA | 99.92 |
| Manganese | 1.28 | ND | NA | >99.99 |
| Strontium | 285 | 0.281 | NA | 99.90 |

ND – Not Detected at or above the reporting limit
NA – Not Analyzed

Fig.7

Williston Basin Produced Water Test Result Summary

| Parameter (ppm unless noted) | Influent | Pretreated | Desalted | Removal (%) |
|---|---|---|---|---|
| pH | 5.98 | 6.96 | 7.10 | ----- |
| Conductivity (µS/cm) | 240000 | 200000 | <1 | >99.99 |
| TDS | 331000 | 176000 | ND | >99.99 |
| TSS | 954 | ND | NA | >99.99 |
| Total Hardness, mg/L (CaCO3) | 44000 | <5 | NA | >99.98 |
| Aluminum | 1.57 | ND | NA | >99.99 |
| Boron | 141 | 73.6 | NA | 47.8 |
| Calcium | 16200 | 6.14 | NA | 99.96 |
| Chloride | 118000 | 163000 | NA | >99.99 |
| Iron | 39 | ND | NA | >99.99 |
| Magnesium | 447 | 0.520 | NA | 99.98 |
| Barium | 6.7 | 0.128 | NA | 98.08 |
| Manganese | 6.71 | ND | NA | >99.99 |
| Silica (SiO2) | 13.7 | 16.2 | NA | ----- |
| Silicon | 6.39 | 7.58 | NA | ----- |
| Sodium | 78900 | 66000 | NA | >99.99 |
| Strontium | 1020 | 0.698 | NA | 99.93 |
| Sulfate | 884 | 15.2 | NA | 98.28 |

ND – Not Detected at or above the reporting limit
NA – Not Analyzed

Fig.8

METHODS OF SEPARATING AND ISOLATING WATER AND OTHER DESIRED CONSTITUENTS FROM OILFIELD PRODUCED BRINES

REFERENCE TO RELATED APPLICATIONS

This application is a continuation of U.S. Nonprovisional application Ser. No. 16/285,317, filed Feb. 26, 2019, entitled "Systems and Methods Separating and Isolating Water and Desired Constituents from Oilfield Produced Brines for Reuse now U.S. Pat. No. 10,899,646,", which claimed the benefit of U.S. Provisional Application No. 62/636,962 entitled "Systems and Methods Separating and Isolating Water and Desired Constituents from Oilfield Produced Brines for Reuse" filed Mar. 1, 2018, the contents of which are incorporated by reference in their entirety, except that in the event of any inconsistent disclosure or definition from the present application, the disclosure or definition herein shall prevail.

BACKGROUND

Discovery of large reserves of oil and gas in shale formations has been a major positive development for the energy picture of the U.S. Hampering the full potential of these valuable resources to be realized are the complications arising from the water produced along with the recovered oil and gas. The separation of this produced water from the recovered oil and gas and the subsequent handling, treatment, and safe disposal of the produced water in combination represent serious challenges facing the oil and gas production industry.

Produced water includes the water trapped in underground formations that is brought to the surface along with oil or gas, water injected into the formations, and any chemicals added to the water during drilling, production, and treatment. Because at least some portion of the produced water has been in contact with the hydrocarbon-bearing formation for centuries, the water contains some of the chemical characteristics of the formation and the hydrocarbon itself. Produced water also may be referred to as "formation water" or "brine", as the water often has a high salt content.

The major constituents of concern in produced water are salt, oil and grease, inorganic or organic compounds naturally occurring in the formation, and chemical additives used in the drilling, hydraulic fracturing, and operation of the well. Produced water is by far the largest volume byproduct or waste stream associated with oil and gas exploration and production.

The physical and chemical properties of produced water vary considerably depending on the geographic location of the field, the geological host formation, and the type of hydrocarbon product being produced from the well. Produced water properties and volume also vary throughout the production lifetime of a well. High salinity arising from sodium chloride (NaCl) and high hardness levels arising from combinations of magnesium (Mg), calcium (Ca), strontium (Sr), and barium (Ba) are common. Sodium chloride is typically the predominant salt in the produced water.

The hydraulic fracturing of a well often requires from 2 to 10 million gallons of water. Oxidizing biocides, hydrochloric acid (HCl), and caustic soda (NaOH) are widely used chemicals for oil and gas exploration and hydrocarbon recovery and are thus found in the produced water. Thus, the produced water from a single well can include these chemicals and have a volume in the millions of gallons.

Despite considerable efforts and investment, presently there are no cost-effective technological solutions available to reduce the huge disposal cost of highly saline produced water from wells. Saltwater desalination technologies can reduce the volume, but do not eliminate the need for disposal of the concentrated brine, which presents significant costs and challenges. Furthermore, conventional ion exchange based water-softening processes are designed for relatively low levels of hardness and not practical for use in softening deep formation produced water with elevated hardness levels and salinities. Furthermore, any presence of iron, manganese, oil, grease, and/or organic matter tends to create serious fouling of conventional ion exchange resins. Ion exchange processes also require removal of suspended solids to prevent plugging or fouling, another disadvantage in the produced water context.

Chemical precipitation is a widely used technology for the removal of metals and other inorganics, suspended solids, fats, oils, greases, Lo and some other organic substances from wastewater. The three most common chemical precipitative softening alternatives include lime softening, lime-soda ash softening, and caustic softening. The selection of one of these alternatives is generally based on cost, water quality and owner and operator preferences.

Water hardness is caused primarily by the dissolution of calcium and magnesium carbonate and bicarbonate compounds in water. Lime (calcium oxide) when added to hard water, reacts to form calcium carbonate, which itself can act as a coagulant, sweeping ions out of solution. Once rendered insoluble, the metal ions will tend to precipitate, thus softening the water. Lime softening facilitates the removal of heavy metals, radioactive elements, and other toxins such as radium 226 & 228, uranium, and arsenic. Lime softening also eliminates iron, manganese, silica and fluoride, as well as certain organic compounds. However, to work effectively precipitation with lime alone requires a great deal of lime.

Lime softening is typically used for water containing low concentrations of non-carbonate hardness. Lime-soda softening may be required with high concentrations of non-carbonate hardness. Caustic soda softening is typically used when the treated water has inadequate carbonate hardness to react with lime. The treatment process using caustic soda follows the same steps as that of lime-soda ash softening. Compared with lime softening, caustic soda softening has the advantages of stability in storage, lower sludge formation, and easy handling.

Caustic soda is mainly produced in the chloralkali process by the electrolysis of sodium chloride (NaCl) with concomitant chlorine gas production. Although HCl cannot be directly synthesized in this process from the concomitant chlorine gas, HCl can be formed by oxidizing the chlorine gas with the hydrogen gas produced at the cathode of the NaCl electrolysis. Thus, NaCl can provide the basis to form both NaOH and HCl.

However, the transport, storage and handling of concentrated oxidizers, HCl, and NaOH come with serious safety concerns for the industry. Furthermore, in most cases these chemicals are used at relatively low concentrations thus transporting the large amount of water required for low concentration solutions is difficult and costly.

As can be seen from the above description, there is an ongoing need for simple and efficient systems and methods to separate the water from produced water and to recover the non-water constituents from the produced water for reuse. It also would be advantageous to convert the recovered non-water constituents to chemicals that could be used onsite. The systems and methods of the present invention overcome at least one of the disadvantages associated with conventional produced water treatment.

SUMMARY

In one aspect, the invention provides a method of processing hydrocarbon produced water, where the method includes deoiling the hydrocarbon produced water to provide a deoiled feed stream; introducing an oxidant to the deoiled feed stream to provide an oxidized feed stream; precipitating the oxidized feed stream to provide a precipitated slurry; passing the precipitated slurry through a tubular membrane filter unit to produce a permeate; reducing the pH of the permeate to provide a reduced pH permeate; passing the reduced pH permeate through a nanofiltration membrane unit to produce a NF permeate and a NF reject; passing the NF permeate to one of an electrolysis cell, a seawater reverse osmosis membrane, and both the electrolysis cell and the seawater reverse osmosis membrane, where the electrolysis cell provides the oxidant, and where the seawater reverse osmosis membrane provides freshwater and a concentrated sodium chloride retentate; passing the concentrated sodium chloride retentate to an electrodialysis device including univalent anion and univalent cation membranes and electrodes to produce a diluate depleted in sodium chloride and a sodium chloride concentrate; passing the diluate to the nanofiltration membrane unit; and passing at least a portion of the sodium chloride concentrate to the electrolysis cell.

In another aspect of the invention, there is a method of processing hydrocarbon produced water, where the method includes deoiling the hydrocarbon produced water to provide a deoiled feed stream; introducing an oxidant to the deoiled feed stream to provide an oxidized feed stream; transferring the oxidized feed stream to a partially complete precipitation and to a substantially complete precipitation; where the substantially complete precipitation precipitates the oxidized feed stream to provide a precipitated slurry, and the partially complete precipitation precipitates the oxidized feed stream to remove from 10% to 95% by weight of total hardness in the oxidized feed stream to provide a less-concentrated precipitated slurry; passing the precipitated slurry from the complete precipitation through a first tubular membrane filter unit to produce a permeate; passing the less-concentrated precipitated slurry from the partially completed precipitation through a second tubular membrane filter unit to produce a hydraulic fracturing brine; reducing the pH of the permeate to provide a reduced pH permeate; passing the reduced pH permeate through a first nanofiltration membrane unit to produce a NF permeate and a NF reject; passing the NF permeate to an electrolysis cell, where the electrolysis cell provides the oxidant.

Other systems, methods, features and advantages of the invention will be, or will become, apparent to one with skill in the art upon examination of the following figures and detailed description. It is intended that all such additional systems, methods, features, and advantages be included within this description, be within the scope of the invention, and be protected by the claims that follow. The scope of the present invention is defined solely by the appended claims and is not affected by the statements within this summary.

BRIEF DESCRIPTION OF THE FIGURES

The invention can be better understood with reference to the following drawings and description. The components in the figures are not necessarily to scale, emphasis instead being placed upon illustrating the principles of the invention.

DETAILED DESCRIPTION

Systems and methods are described that remove at least a portion of contaminants such as oil, suspended solids, scale-forming ions, and volatile organic material from produced water to provide a partially treated brine stream for reuse in oil and/or gas extraction processes. A portion of the partially treated brine stream may undergo desalination to produce fresh water and concentrated brine. The systems and methods may be configured to produce a sterile, substantially particle free brine; a concentrated heavy brine; in some embodiments an ultra-high purity brine; an oxidizing biocide; HCl; NaOH; and fresh water. The chemicals produced may be used in hydraulic fracturing, stimulation in oil and gas extraction, or other industrial applications. When desalination is used, the fresh water produced may be used for irrigation, industrial use, and/or other applications.

Figure 1:
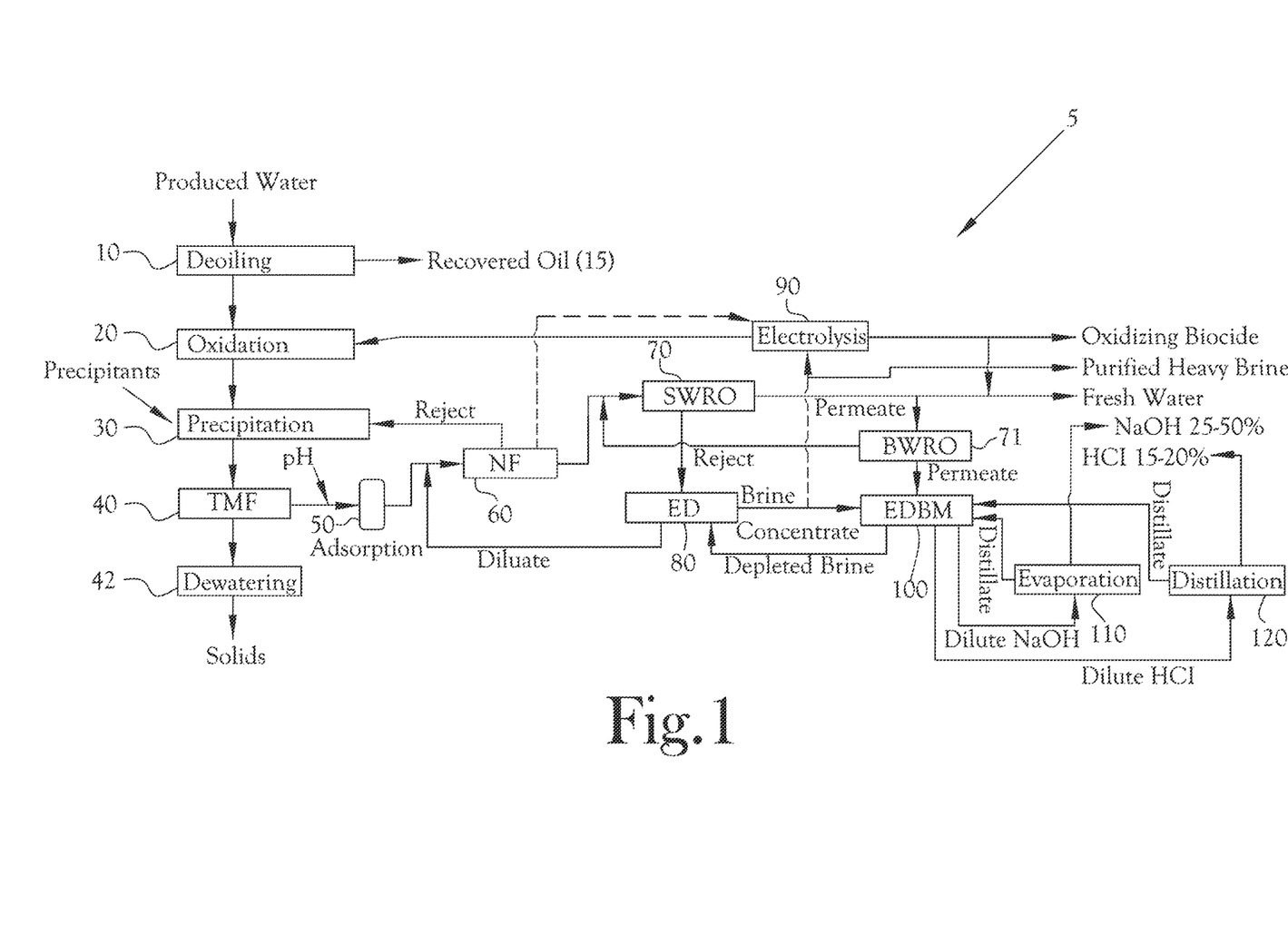
FIG. 1 represents a system for treating produced water having a low (<40 g/L) concentration of total dissolved solids (TDS).

FIG. 1 represents a system 5 for treating produced water having a low (<40 g/L) concentration of total dissolved solids (TDS). The produced water from the well enters deoiling 10 to produce recovered oil 15 and a deoiled feed stream. The deoiling function is provided by gravity separation methods as known in oil and gas industry, or through other methods known in the art. Produced water may enter the deoiling 10 from a two or three phase separator, a free water knockout, a gun barrel, a heater treater, hydro-cyclone, or other primary separation unit process for hydrocarbon removal.

The deoiled feed stream is then passed to oxidation 20 where an oxidant is introduced to the deoiled feed stream. The oxidant is in the form of a mixed oxidant generated from undivided or divided electrolysis cell 90. Undivided electrolysis cells produce an oxidant strength of 0.01-0.25% as $Cl_2$ by weight, while membrane divided electrolysis cells produce $Cl_2$ at 5-12% by weight concentration—thus at least three orders of magnitude higher. Undivided electrolysis cells are generally fed seawater strength brine while membrane divided cells are generally fed a near saturation strength brine.

Purified, halogen-containing brine generated by the system 5 is fed to the electrolysis cell 90 for enhanced oxidation or reduction. In the event of an undivided electrolysis cell 90, the seawater strength brine is obtained from the NF 60, as discussed further below. In the event of a divided electrolysis cell 90, the near saturation brine is obtained from the ED 80, as discussed further below.

The enhanced oxidation or reduction provided by the electrolysis cell 90 destructs contaminants in either brine and generates a liquid with a significantly enhanced oxidation potential. The enhanced oxidation potential liquid serves as an oxidant in the oxidation 20 and as an oxidizing biocide. In addition to producing sodium hypochlorite for direct use as an oxidizing biocide, the produced sodium hypochlorite may be combined with the produced HCl to generate a first reaction product and then introducing sodium chlorite from an outside source to form a product stream comprising chlorine dioxide ($ClO_2$) and free available chlorine.

There are two basic types of electrolysis (electrolytic) cells, namely divided cells and undivided cells. In both cell types, certain ions may travel between the electrodes. In a divided cell, the cathode and anode sides of the cell are separated (divided) in some manner such that most or all of the reactants and products on each side of the cell are kept separate. In the undivided cells, the cathode and anode sides of the cell are not separated (undivided) and the reactants and products on each side of the cell can mix. Suitable electrolysis cells are sold, for example, by De Nora, Japan, as electrochlorination systems.

After the oxidation 20, the resulting oxidized feed stream is introduced to precipitation 30 to soften the oxidized feed stream. A modified lime-soda precipitation may be used to soften the oxidized feed stream. The modified lime-soda precipitation process may be preferred as conventional lime methods often require large amounts of lime and conventional caustic soda softening cannot remove as many contaminants as lime. Thus, the modified process includes lime, but also introduces caustic (NaOH) from the EDBM unit 100. Depending on the produced water, conventional softening agents including lime-softening, lime-soda ash softening, and caustic softening may be used. The precipitation 30 preferably includes the use of mechanical agitators to disperse the reagents more effectively into the oxidized feed stream and to maintain precipitated solids in suspension to enhance agglomeration of small precipitates into larger precipitates.

After the precipitation 30, the resulting concentrated sodium chloride containing ultra-high purity brine slurry is introduced to tubular membrane filter unit (TMF) 40, where the concentrated slurry is preferably overdosed from a stoichiometric perspective with additional precipitating agent, such as lime, soda ash, and/or caustic soda (NaOH), to enhance precipitation. Stoichiometric overdosing is preferred because chemical equilibriums require more than the stoichiometric quantity of the reagents to drive the precipitation reaction near completion. Barium removal by sulfate precipitation also may be performed in precipitation 30 and/or TMF 40.

The TMF 40 uses a semipermeable tubular membrane including sub-micron filtration media—thus a filtration membrane having a pore size of less than 1 micron. The permeate from the concentrated slurry of the precipitation 30 is received into the tubes of the tubular membrane from the outside of the tubular membrane and includes less dissolved solids than would be predicted by the solubility limits of the dissolved solids.

The semipermeable tubular membrane of the TMF 40 is preferably a polymeric polyvinylidene fluoride (PVDF) or polyethylene (PE) membrane having an absolute pore size of 0.05 to 0.1 microns. Such tubular PVDF membranes are available from Porex Filtration, Fairburn, Ga., for example. While less preferred, a ceramic membrane of similar pore size range may be used in the TMF 40.

The semipermeable tubular membrane may be cleaned of surface precipitates with the dilute HCl solution produced by EDBM 100. The dilute HCl solution may be circulated through the TMF 40 membrane until the precipitate is dissolved to an acceptable level. In the event the TMF 40 membrane fouls with organic compounds, the membrane may be cleaned by circulating the sodium hypochlorite solution generated in the electrolysis cell 90 through the membrane until acceptable flow through the membrane is restored.

When the TMF 40 has concentrated the solids to an acceptable level from the concentrated slurry, the solids are transferred to dewatering 42. The solids include residue created from the precipitation 30 and may be very high in calcium carbonate or a mixture of calcium carbonate and magnesium hydroxide. The dewatering 42 is preferably performed with a filter press. However, lagooning, vacuum filtration, or centrifugation also may be used.

The permeate from the TMF 40 is sterile and substantially particle free and will generally have a pH greater than 10, which needs to be reduced. Preferably, the HCl generated from EDBM 100 may be used to reduce the pH of the permeate. Less preferably, carbon dioxide or a mineral acid may be used.

In combination the precipitation 30 and the TMF 40 can remove a broad range of dissolved contaminants to acceptable levels. The removed contaminants include Ca, Mg, Ba, Sr, Fe, Mn, Cu, Zn, Al, Si, total organic carbon (TOC), oil, grease, and suspended solids.

Once the pH of the TMF 40 permeate is reduced, the reduced pH permeate is transferred to adsorption 50. The adsorption 50 dechlorinates the permeate to prevent oxidation of the later NF 60 and SWRO 70 membranes. The adsorption 50 preferably includes granular carbon to dechlorinate the permeate. Alternatively, powdered activated carbon may be added to the concentrated lime slurry before transferring to the TMF 40. Alternatives to the granular carbon include chemical reducing agents, such as sodium metabisulfite and ascorbic acid. More preferably, a combination of granular carbon and a chemical reducing agent is used in the adsorption 50.

The dechlorinated permeate from 50 is then transferred to a nanofiltration membrane unit (NF) 60. The NF 60 is used under pressure to selectively change the concentration of one solute, such as sodium chloride having monovalent ions, from another solute, such as sodium sulfate having multivalent ions. The NF 60 allows for the substantial removal of sulfate, phosphate, calcium, magnesium, aluminum, and silica monovalent and divalent ions from the dechlorinated permeate.

The NF 60 membrane is structurally similar to a reverse osmosis (RO) membrane, however, unlike RO membranes, the NF 60 membrane is characterized by a larger pore size in the "skin layer" and a net negative electrical charge inside the individual pores of the NF membrane. This negative charge is responsible for rejection of anionic species, according to the anion surface charge density. Accordingly, divalent anions, such as sulfate ($SO_4$), are more strongly rejected than monovalent anions, such as Cl−. NF membranes are available from Dow as part of the FILMTEC™ NF90 and NF270 series, for example.

The nanofiltration performed by the NF 60 membrane is characterized by a fractionation capacity for organic solutes with a molecular "cut-off" range of about 300 g/mol; and a fractionation capacity for multivalent vs. monovalent ions, which is especially pronounced for anions. The sulfate containing concentrate (reject or retentate from the NF 60) is returned to the precipitation 30 to enrich/enhance (calcium and barium sulfate) precipitant growth.

The permeate from the NF 60 is then transferred to the electrolysis cell 90 if an undivided cell, or to SWRO 70 where sodium chloride and purified water are recovered. The SWRO 70 is a conventional seawater reverse osmosis (RO) membrane. Such SWRO membranes are available from DOW as part of the FILMTEC™ SW30 series, for example.

SWRO is generally accepted as the most economical and energy-efficient method for desalination of highly saline water. Modern SWRO membranes have high salt rejection and are capable of producing potable water, <500 ppm salinity, from seawater (nominally 35 g/L) in a single pass through the membrane. Modern SWRO systems are capable of achieving up to 50% recovery of fresh water from seawater. With 50% recovery, the salinity of the concentrated brine (reject/retentate) increases to about 70 g/L.

A first portion of the permeate lacking concentrated sodium chloride from the SWRO 70 is passed to brackish water RO membrane (BWRO) 71. The BWRO further reduces salinity for use in EDBM 100 or for cooling water makeup. Such BWRO membranes are available from DOW as part of the FILMTEC™ LE and BW30 series, for example. A second portion of the permeate lacking concentrated sodium chloride from the SWRO 70 is considered fresh water.

The reject/retentate including concentrated sodium chloride from the SWRO 70 is passed to an electrodialysis device (ED) 80 that includes univalent anion and univalent cation selective membranes. The ED 80 includes a pair of electrodes (anode and cathode) and has a plurality of membranes, with at least one electrodialysis membrane being a univalent anion-selective membrane and another electrodialysis membrane being a univalent cation-selective membrane. The plurality of alternating anion-permeable and cation-permeable membranes are disposed between the anode and the cathode to form a series of alternating dilute and concentrate channels between the alternating membranes. The anion-permeable membranes allow the passage of anions through the membrane, while the cation-permeable membranes allow the passage of cations through the membrane. In combination, these membranes separate the reject/retentate into a diluate that is depleted in sodium chloride and a concentrate that is concentrated in sodium chloride. The concentrate may be considered a "heavy brine" having a from 1.1 to 1.2 kg/L salt concentration. Suitable ED's sold under the Acilyzer ED name may be obtained from Astom, Japan, for example.

The diluate from the ED 80 is recycled to the NF 60 and at least a first portion of the ED concentrate is transferred to the electrolysis cell 90 in the event the electrolysis cell 90 is divided, while a second portion of the ED concentrate is transferred to the EDBM 100. The bipolar membrane electrodialysis unit (EDBM) 100 converts the sodium chloride into a dilute sodium hydroxide (NaOH) solution and a dilute hydrochloric acid (HCl) solution. Preferably, the second portion of the ED concentrate transferred to the EDBM 100 has a sodium chloride concentration in excess of 17% by weight.

The EDBM 100 produces an acidic HCl stream and a basic NaOH stream. In the EDBM 100, the salt, acid, and base streams are distributed between membranes that are stacked up in repeating sequences called repeat units. Anions are transported across the anion permeable membrane; cations are transported across the cation permeable membrane; and the production of protons and hydroxide ions occurs in the bipolar membrane. The produced hydroxide ions and protons move towards the (positive) anode and the (negative) cathode, respectively, by means of migration in an electrical field. Ideally, they are trapped in the compartments adjacent to the two sides of the bipolar membrane in the respective base and acid compartment which results in the concentration of the base and acid in the respective base and acid compartments. The concentrated acid, the concentrated base, and the resulting reduced salt solution are collected and leave the EDBM 100. Suitable EDBM's sold under the Acilyzer BPED name may be obtained from Astom, Japan, for example.

The pre-concentration of the salt by the ED 80 and the SWRO 70/BWRO 71 allow the EDBM 100 to operate at sufficiently high current density to convert a significant portion of the salt to acid and base and efficiently use the electricity consumed. The return of the depleted brine from the EDBM 100 to the ED 80 for concentration is also of benefit in this regard as the depleted brine is not "waste", but can be re-concentrated to the elevated salt level required for higher current density in further EDBM 100 processing.

Unlike membranes used for separation purposes, such as the previously described ED 80, species should not be transported from one side to the other of the EDBM 100 membranes. The desired function of the EDBM 100 membranes is a reaction in the bipolar junction of the membrane where the anion and the cation permeable layers are in direct contact. A disproportionation reaction splits water into hydroxide ions and protons. The produced hydroxide ions and protons are separated by migration in the respective membrane layer out of the membrane. Unlike water splitting at electrodes during electrolysis, no gases are formed as a side product of the disproportionation reaction, nor are gases consumed.

The NaOH base stream leaving the EDBM 100 may undergo evaporation 110 to increase the NaOH concentration and provide a dilute NaOH/water solution back to the base loop of the EDBM 100 and a finished caustic product. Preferably the evaporation 110 increases the 3% to 4% by weight NaOH base stream leaving the EDBM 100 to from 25% to 50% by weight to form the finished caustic product.

Similarly, the HCl acid stream leaving the EDBM 100 may undergo distillation 120 to increase the HCl concentration and provide a dilute HCl/water solution back to the acid loop of the EDBM 100 and a finished acid product. Preferably the distillation 120 increases the 4% to 8% by weight HCl acid stream leaving the EDBM 100 to from 15% to 20% by weight to form the finished acid product.

Figure 3:
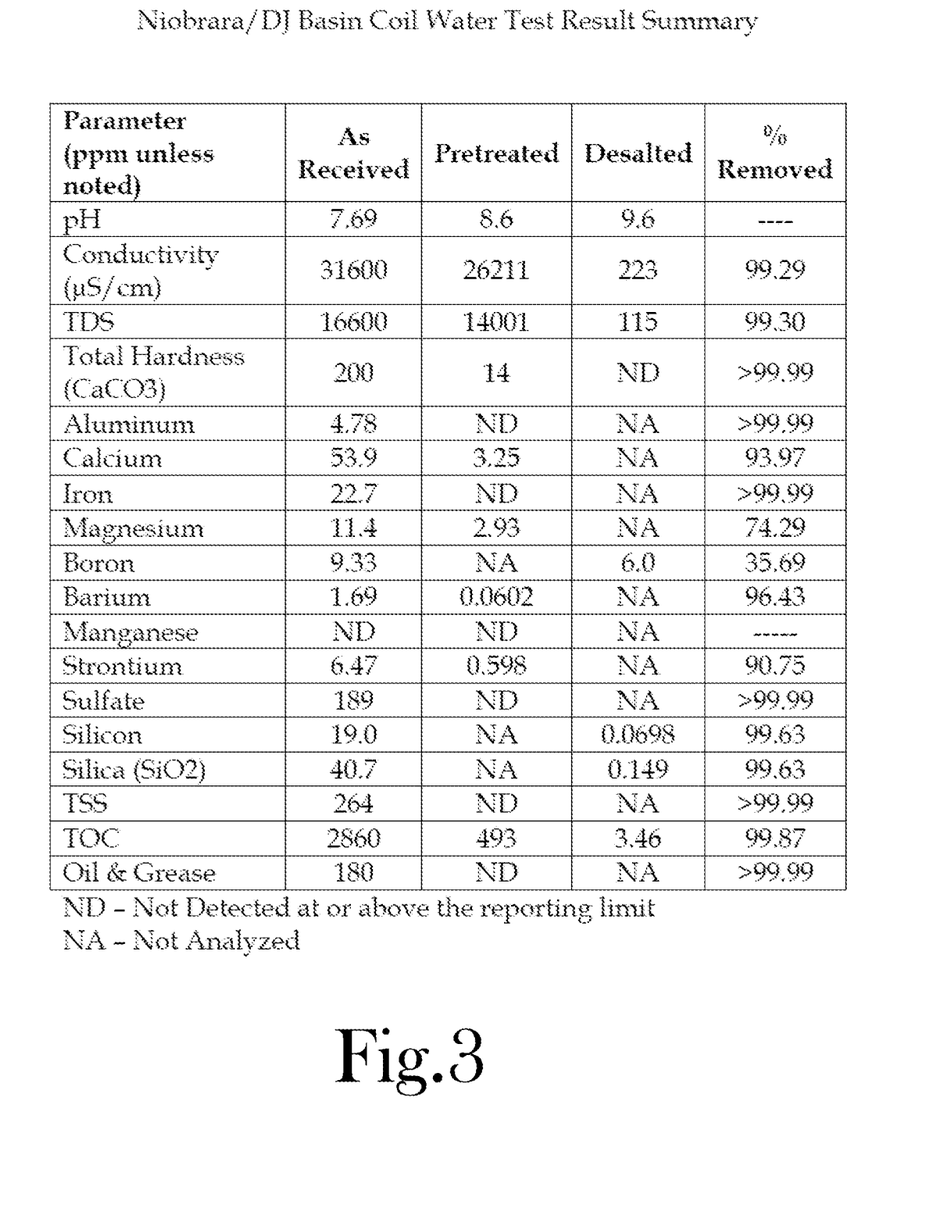
FIG. 3 provides the initial TDS and contaminant content, intermediate treatment content, and percent TDS removal from produced water obtained during production at the DJ Basin.
Figure 4:
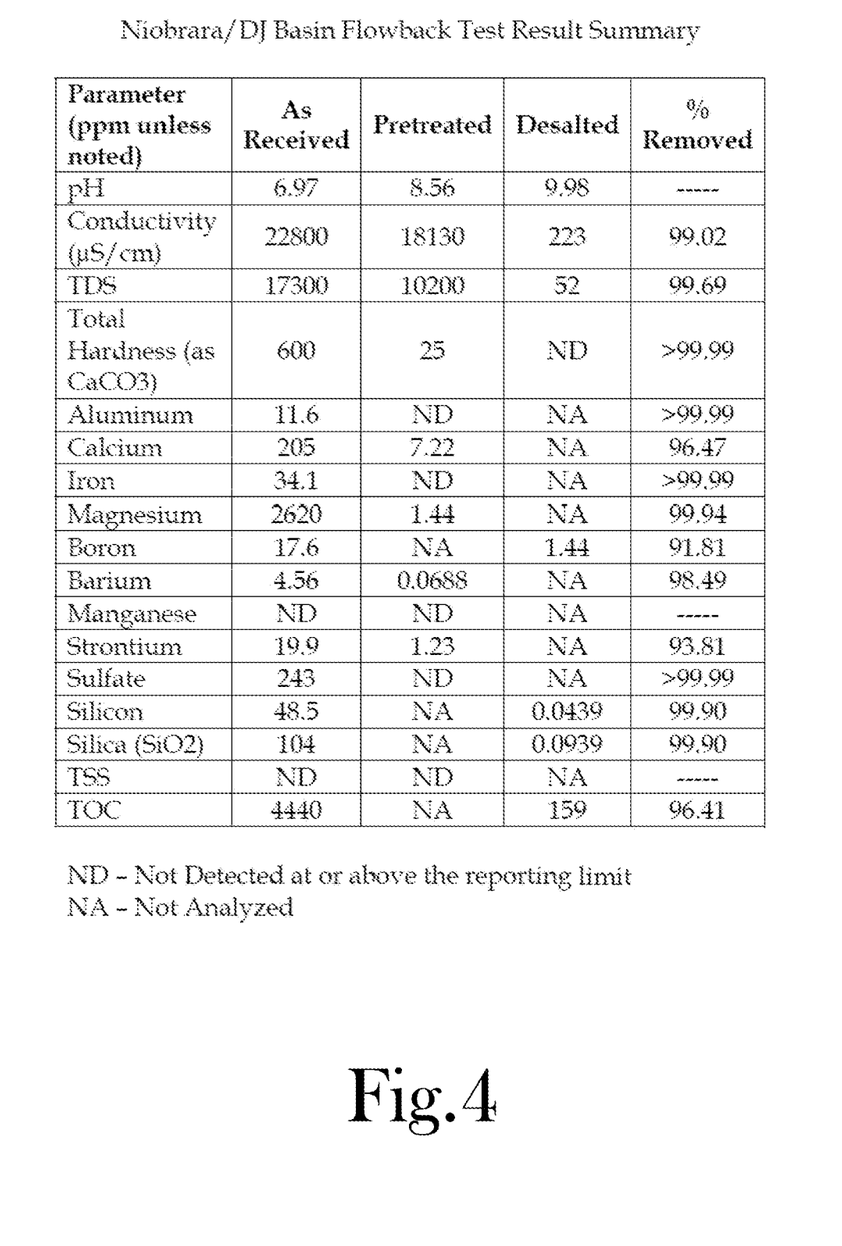
FIG. 4 provides the initial TDS and contaminant content, intermediate treatment content, and percent TDS removal from produced water obtained during flowback (60-90 days after hydraulic fracturing) at the DJ Basin.
Figure 5:
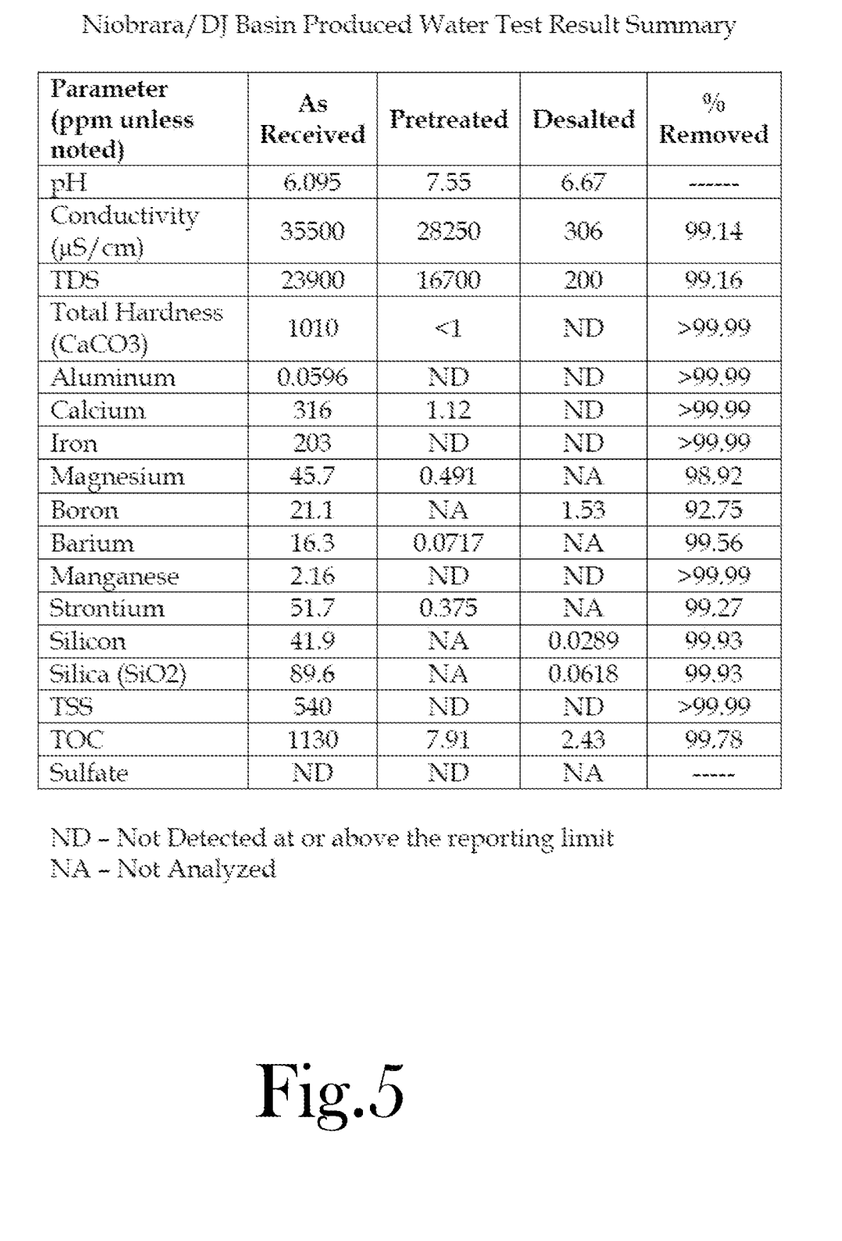
FIG. 5 provides the initial TDS and contaminant content, intermediate treatment content, and percent TDS removal from produced water obtained during production at the DJ Basin.

The system 5 of FIG. 1 may be used to treat the produced water represented in FIG. 3, FIG. 4, and FIG. 5 as the system 5 is optimized to operate up to 40,000 TDS (40 g/L).

Figure 2:
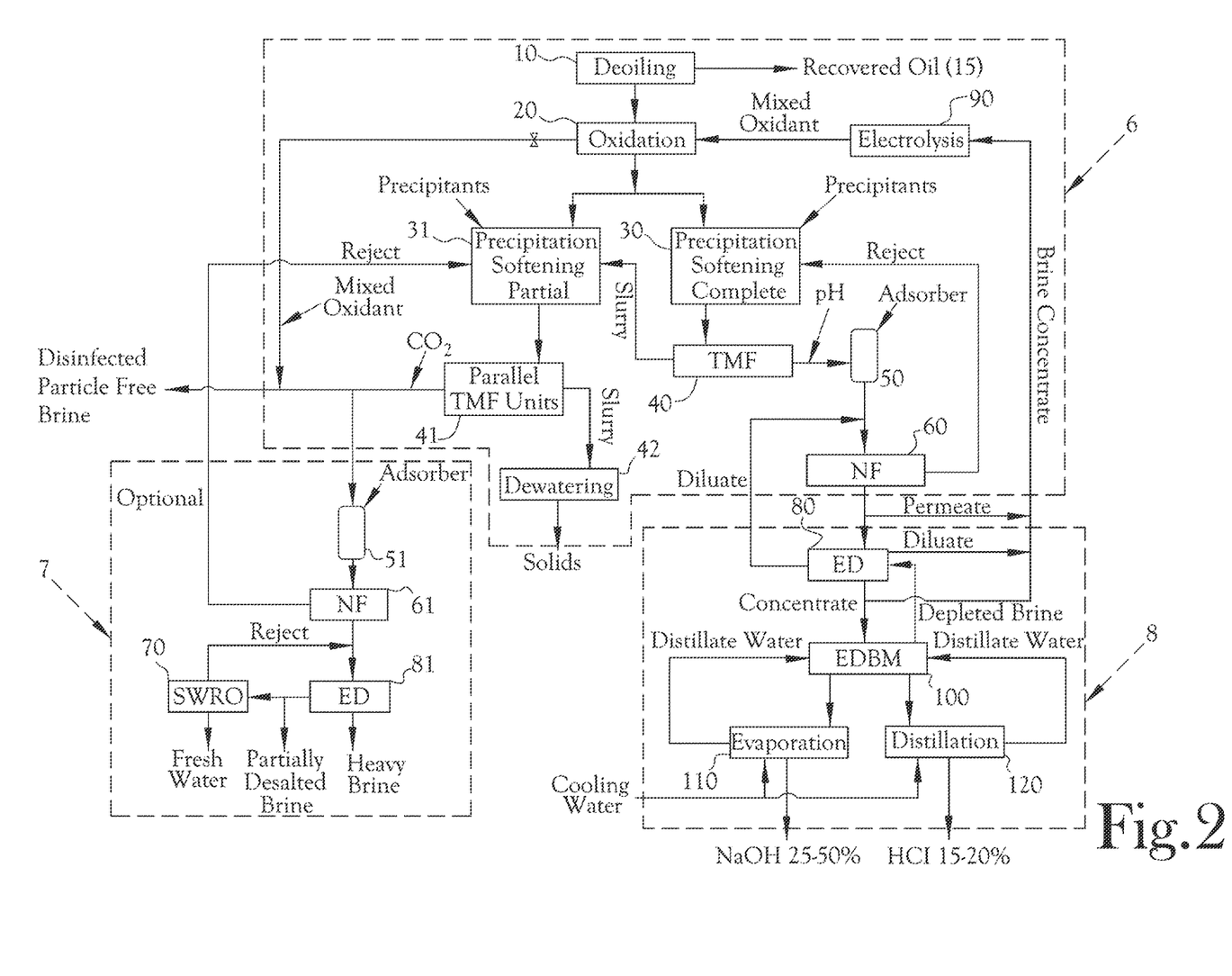
FIG. 2 represents a system for treating produced water having a high (≤40 g/L) concentration of total dissolved solids (TDS).

FIG. 2 represents a system for treating produced water having a high (≥50 g/L) concentration to total dissolved solids (TDS). To process the much higher TDS concentration in relation to system 5 of FIG. 1, the system represented in FIG. 2 adds additional precipitation, TMF, NF, and ED units. Thus, the initial processing system 6 may include an optional fresh water production system 7, and/or an optional chemical production system 8.

For the initial processing system 6, the produced water enters the deoiling 10 and is then transferred to the oxidation 20 as previously described in the context of FIG. 1. However, unlike the single precipitation 30 of FIG. 1, the precipitation function is performed in parallel by the precipitation 30, where substantially complete precipitation is still performed as previously described in the context of FIG. 1, and by the addition of partially complete precipitation 31.

The substantially complete precipitation 30 of FIG. 2 functions as with the prior precipitation 30 and removes substantially all hardness from the water. Thus, the substantially complete precipitation 30 provides the concentrated sodium chloride containing ultra-high purity brine slurry suitable for the electrolysis cell 90, as previously discussed in the context of FIG. 1. In contrast, the partially complete precipitation 31 is operated to remove from 10% to 95% of the total hardness by weight in the water so the output is a less-concentrated sodium chloride containing brine slurry suitable for additional processing and reuse in hydraulic fracturing, or may be further desalinized in the water production system 7. In relation to the substantially complete precipitation 30, the partially complete precipitation 31 uses less softening agent to target the 10% to 95% hardness removal as opposed to the 100% target removal used for the substantially complete precipitation 30. Thus, in the partially complete precipitation 31, stoichiometric overdosing with the softening agent is not used as less than a 100% precipitation target is desired.

The initial processing system 6, adds a second TMF 41 to process the less-concentrated precipitated slurry operating in combination with the TMF 40 as previously described in the context of FIG. 1. The second TMF 41 produces a permeate which is suitable for reuse as a hydraulic fracturing brine and solids that may be transferred for the dewatering 42 as previously described in the context of FIG. 1. Carbon dioxide may be added from an external source to the hydraulic fracturing brine produced by the second TMF 41. The parallel precipitations 30/31 allow for the two TMF 40/41, and thus a near doubling in capacity in relation to the system 5 of FIG. 1.

Unlike with the system 5 of FIG. 1, the higher TDS produced water does not allow direct connection of a NF unit to a SWRO unit as was possible for the system 5. Instead, regarding FIG. 2, the first NF 60 and a second NF 61 transfer to first ED 80 and second ED 81, respectively. This is done because ED units can make a brine of considerably higher concentration (200 g/L or greater) than can be recovered from SWRO.

The first ED 80 produces a first diluate depleted in sodium chloride and a first sodium chloride concentrate. The first diluate is returned to the electrolysis cell 90. The first sodium chloride concentrate may be passed to the electrolysis cell 90 or to the EDBM 100 as previously described in the context of FIG. 1. The EDBM 100 can form acid and base streams which may be used in the system 6 as previously described or converted to finished acid and base products.

The second ED 81 produces a second diluate depleted in sodium chloride and a second sodium chloride concentrate. The second diluate is a partially desalted brine that may be directly used or passed to the SWRO 70 as previously described in the context of FIG. 1 to produce fresh water. The reject from the SWRO 70 may be returned to the ED 81 for continued concentrations.

Figure 6:
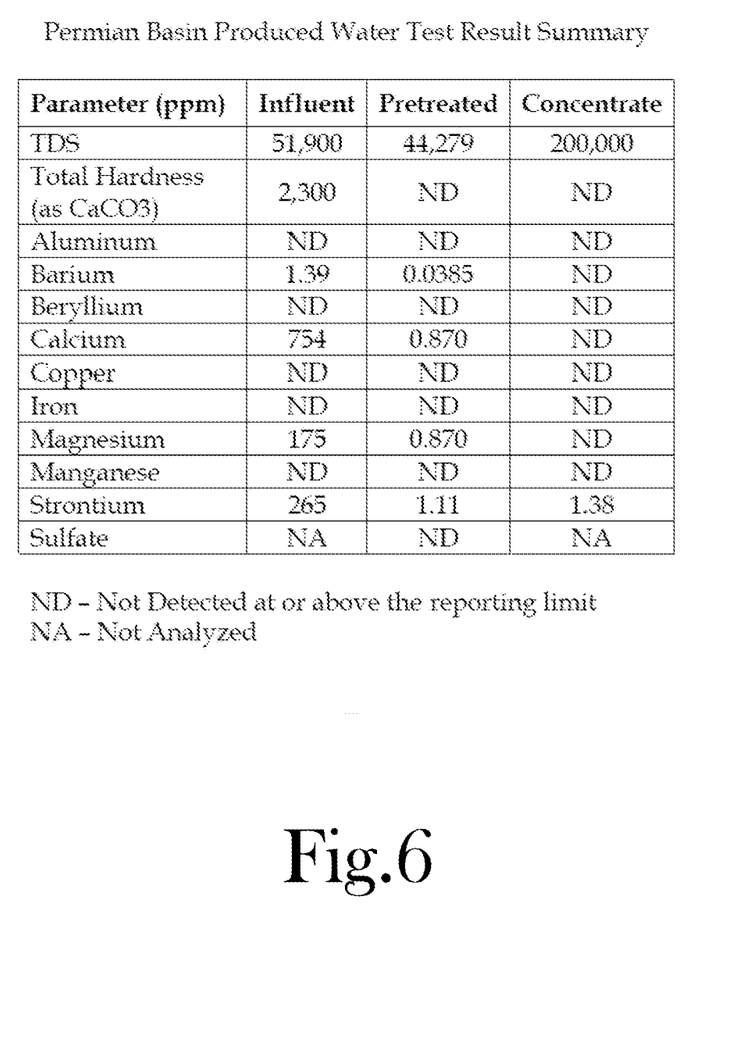
FIG. 6 provides the initial TDS and contaminant content, intermediate treatment content, and percent TDS removal from produced water obtained during production at the Permian Basin.
Figure 7:
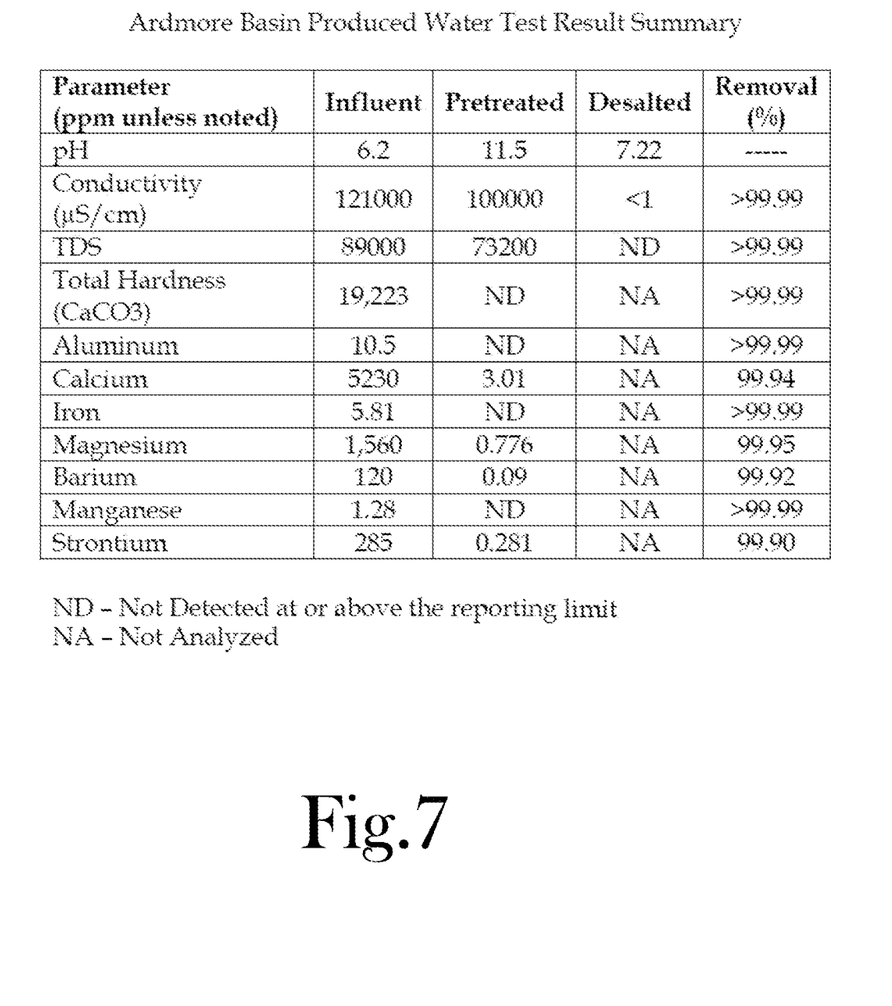
FIG. 7 provides the initial TDS and contaminant content, intermediate treatment content, and percent TDS removal from produced water obtained during production at the Ardmore Basin.
Figure 8:
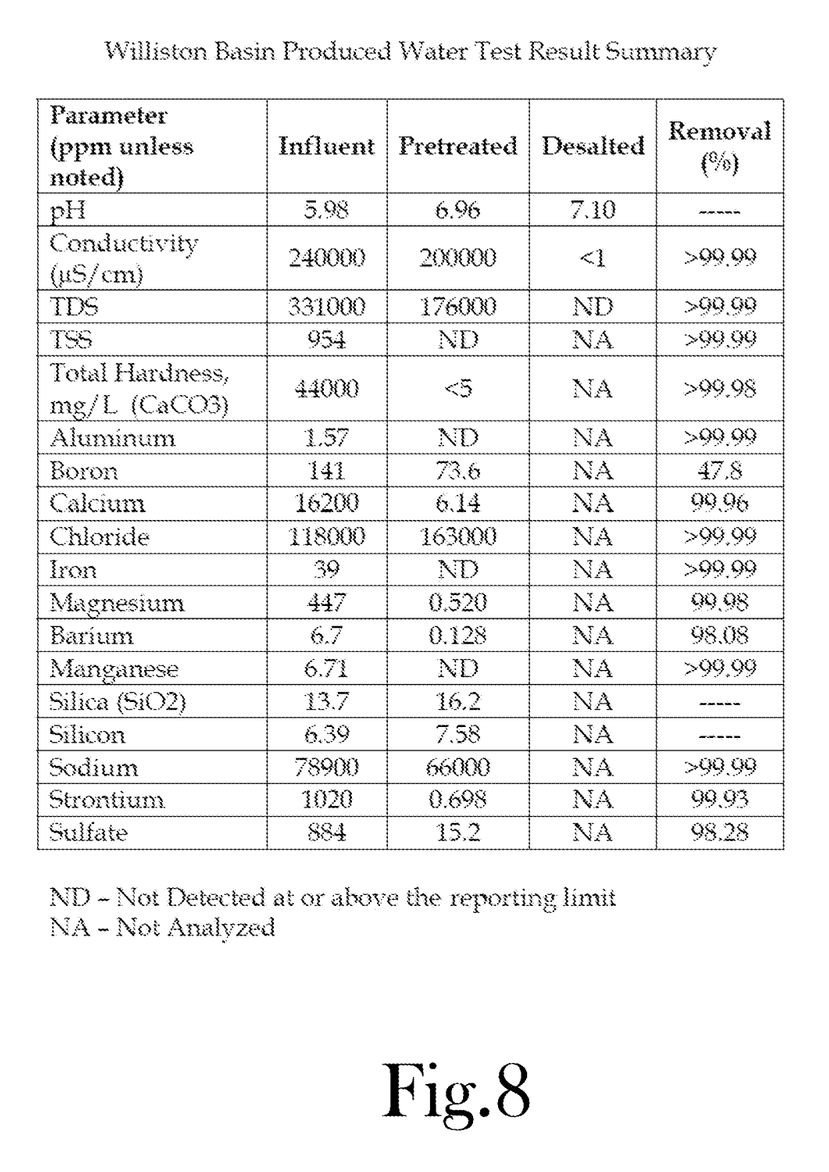
FIG. 8 provides the initial TDS and contaminant content, intermediate treatment content, and percent TDS removal from produced water obtained during production at the Williston Basin.

The system 6 of FIG. 2 may be used to treat the produced water represented in FIG. 6, FIG. 7, and FIG. 8 as the system 6 is optimized to operate at and above 40,000 TDS (40 g/L).

Unless the context clearly dictates otherwise, where a range of values is provided, each intervening value to the tenth of the unit of the lower limit between the lower limit and the upper limit of the range is included in the range of values.

While various aspects of the invention are described, it will be apparent to those of ordinary skill in the art that other embodiments and implementations are possible within the scope of the invention. Accordingly, the invention is not to be restricted except in light of the attached claims and their equivalents.

The invention claimed is:

1. A method of processing produced water, the method comprising:
   deoiling the produced water to provide a deoiled feed stream;
   introducing an oxidant to the deoiled feed stream to provide an oxidized feed stream;
   transferring the oxidized feed stream to a partially complete precipitation and to a substantially complete precipitation;
   where the substantially complete precipitation precipitates the oxidized feed stream to provide a precipitated slurry, and
   the partially complete precipitation precipitates the oxidized feed stream to remove from 10% to 95% by weight of total hardness in the oxidized feed stream to provide a less-concentrated precipitated slurry;
   passing the precipitated slurry from the complete precipitation through a first tubular membrane filter unit to produce a permeate;
   passing the less-concentrated precipitated slurry from the partially completed precipitation through a second tubular membrane filter unit to produce a hydraulic fracturing brine;
   reducing the pH of the permeate to provide a reduced pH permeate;
   passing the reduced pH permeate through a first nanofiltration membrane unit to produce a NF permeate and a NF reject;
   passing the NF permeate to an electrolysis cell, where the electrolysis cell provides the oxidant.

2. The method of claim 1, wherein the deoiling includes recovering a hydrocarbon fraction from the produced water.

3. The method of claim 1, wherein the electrolysis cell is undivided.

4. The method of claim 1, wherein the electrolysis cell is divided.

5. The method of claim 1, wherein the substantially complete precipitation and the partially complete precipitation include adding lime and sodium hydroxide to the oxidized feed stream.

6. The method of claim 1, further comprising stoichiometrically overdosing the precipitated slurry with a precipitation agent selected from lime, soda ash, caustic soda, and combinations thereof.

7. The method of claim 1, where the first tubular membrane filter unit and the second tubular membrane filter unit comprise a semipermeable tubular membrane having a pore size of less than 1 micron.

8. The method of claim 7, further comprising cleaning the semipermeable tubular membranes with a cleaning solution selected from hydrochloric acid, sodium hypochlorite, and combinations thereof.

9. The method of claim 1, further comprising removing and dewatering solids from the second tubular membrane filter unit.

10. The method of claim 1, wherein the reducing the pH of the permeate includes contacting the permeate with hydrochloric acid.

11. The method of claim 1, further comprising dechlorinating the precipitated slurry or the reduced pH permeate.

12. The method of claim 11, wherein the dechlorinating includes contacting the precipitated slurry or the reduced pH permeate with carbon.

13. The method of claim 1, further comprising returning the NF reject to the substantially complete precipitation.

14. The method of claim 1, further comprising using at least a portion of the hydraulic fracturing brine for hydraulic fracturing.

15. The method of claim 1, wherein the oxidant includes sodium hypochlorite.

16. The method of claim 1, further comprising removing barium from the produced water.

17. The method of claim 1, wherein the nanofiltration membrane unit includes a nanofiltration membrane having a molecular cut-off of about 300 g/mol.

18. The method of claim 1, further comprising:
transferring the NF permeate to a first electrodialysis device including univalent anion and univalent cation membranes and electrodes to produce a first diluate depleted in sodium chloride and a first sodium chloride concentrate;
passing the first diluate to the electrolysis cell;
passing at least a portion of the first sodium chloride concentrate to a bipolar membrane electrodialysis unit; and
generating a hydrochloric acid stream and a sodium hydroxide stream from the bipolar membrane electrodialysis unit.

19. The method of claim 1, further comprising:
passing a portion of the hydraulic fracturing brine through a second nanofiltration membrane to produce a second NF permeate and a second NF reject;
transferring the second NF reject to the partially complete precipitation; and
transferring the second NF permeate to a second electrodialysis device including univalent anion and univalent cation membranes and electrodes to produce a second diluate depleted in sodium chloride and a second sodium chloride concentrate.

20. The method of claim 19, further comprising transferring the second diluate to a seawater reverse osmosis membrane to provide freshwater.

21. A method of processing produced water, the method comprising:
deoiling the produced water to provide a deoiled feed stream;
introducing an electrolysis cell-provided oxidant to the deoiled feed stream to provide an oxidized feed stream;
precipitating the oxidized feed stream to provide a precipitated slurry;
passing the precipitated slurry through a tubular membrane filter unit to produce a permeate;
reducing the pH of the permeate to provide a reduced pH permeate;
passing the reduced pH permeate through a nanofiltration membrane unit to produce a NF permeate and a NF reject;
passing the NF permeate to said electrolysis cell, to a freshwater and concentrated sodium chloride retentate-providing seawater reverse osmosis membrane, or to both the electrolysis cell and the seawater reverse osmosis membrane;
passing the concentrated sodium chloride retentate to an electrodialysis device including univalent anion and univalent cation membranes and electrodes to produce a diluate depleted in sodium chloride and a sodium chloride concentrate;
passing the diluate to the nanofiltration membrane unit; and
passing at least a portion of the sodium chloride concentrate to the electrolysis cell.

22. The method of claim 21, further comprising after passing at least a portion of the sodium chloride concentrate to the electrolysis cell, generating a sodium hypochlorite solution.

23. The method of claim 22, wherein the sodium hypochlorite solution is the electrolysis cell-provided oxidant.

24. The method of claim 21, wherein the deoiling includes recovering a hydrocarbon fraction from the produced water.

25. The method of claim 21, wherein the electrolysis cell is undivided.

26. The method of claim 21, wherein the precipitating includes adding lime and sodium hydroxide to the oxidized feed stream.

27. The method of claim 21, further comprising stoichiometrically overdosing the precipitated slurry with a precipitation agent selected from lime, soda ash, caustic soda, and combinations thereof.

28. The method of claim 21, wherein the tubular membrane filter unit comprises a semipermeable tubular membrane having a pore size of less than 1 micron.

29. The method of claim 28, further comprising cleaning the semipermeable tubular membrane with a cleaning solution selected from hydrochloric acid, sodium hypochlorite, and combinations thereof.

30. The method of claim 21, further comprising removing and dewatering solids from the tubular membrane filter unit.

31. The method of claim 21, further comprising dechlorinating the precipitated slurry or the reduced pH permeate.

32. The method of claim 31, wherein the dechlorinating includes contacting the precipitated slurry or the reduced pH permeate with carbon.

33. The method of claim 21, further comprising returning the NF reject to the precipitating step.

34. The method of claim 21, where the seawater reverse osmosis membrane further provides low salt water to a brackish water reverse osmosis membrane.

35. The method of claim 21, further comprising using at least a portion of the sodium chloride concentrate for hydraulic fracturing.

36. The method of claim 21, wherein the oxidant includes sodium hypochlorite.

37. The method of claim 21, further comprising removing barium from the produced water.

38. The method of claim 21, where the nanofiltration membrane unit includes a nanofiltration membrane having a molecular cut-off of about 300 g/mol.

* * * * *